United States Patent [19]
Hirose

[11] Patent Number: 5,338,459
[45] Date of Patent: Aug. 16, 1994

[54] MUDDY AND WASTE WATER TREATMENT METHOD

[75] Inventor: Kaoru Hirose, Kochi, Japan

[73] Assignee: Daiyo Kiko Industry, Inc., Kochi, Japan

[21] Appl. No.: 122,338

[22] Filed: Sep. 17, 1993

Related U.S. Application Data

[62] Division of Ser. No. 845,203, Mar. 3, 1992, Pat. No. 5,252,202.

[30] Foreign Application Priority Data

Nov. 19, 1991 [JP] Japan ................................ 3-331379
Dec. 13, 1991 [JP] Japan ................................ 3-352057

[51] Int. Cl.$^5$ ............................................. C02F 1/38
[52] U.S. Cl. .................................. 210/710; 210/712; 210/726; 210/744; 210/787; 210/918; 209/5
[58] Field of Search .............. 210/702, 710, 712, 726, 210/727, 744, 770, 787, 918; 209/5; 494/5, 26, 58

[56] References Cited

U.S. PATENT DOCUMENTS

| | | | |
|---|---|---|---|
| 3,398,888 | 8/1968 | Koenecke et al. | 494/26 |
| 3,577,341 | 5/1971 | Keith et al. | 210/781 |
| 3,647,067 | 3/1972 | Vogel | 210/100 |
| 4,229,298 | 10/1980 | Bange | 210/100 |
| 4,652,254 | 3/1987 | Matsumoto | 494/58 |
| 5,044,092 | 9/1991 | Journet et al. | 210/781 |
| 5,145,256 | 9/1992 | Wiemers et al. | 210/252 |
| 5,252,202 | 10/1993 | Hirose | 210/86 |

FOREIGN PATENT DOCUMENTS 56-70893 6/1981 Japan ................................ 210/727
59-16505 1/1983 Japan.

Primary Examiner—Peter A. Hruskoci
Attorney, Agent, or Firm—Joseph W. Berenato, III

[57] ABSTRACT

A water treatment method and device can perform a regeneration treatment of the muddy water once used in a water excavation work to decrease its specific gravity for reuse in the water excavation work, and a dehydration treatment of various waste waters such as muddy water from the water excavation work and industrial waste water for final disposal.

The dehydration treatment includes a flocculating step for flocculating fine muddy particles, a solid-liquid separating step for separating the floccus to a solid part and a liquid part, a discharging step for discharging the liquid part through a filtering and water cleansing step, and a solid part treatment step for treating the solid part separated at the solid-liquid separating step, and the regeneration treatment including a solid-liquid separating step for separating the muddy water to a solid part and a liquid part and a reusing step for reusing the separated liquid part which is free from the muddy particles by the solid-liquid separating step, and a solid part treatment step for treating the solid part separated at the solid-liquid separating step.

The solid-liquid separating step is achieved by a centrifugal separator whose inner basket is composed of a non-perforated wall and a wheel shaped bottom.

2 Claims, 16 Drawing Sheets

MUDDY AND WASTE WATER TREATMENT METHOD

This is a division of application Ser. No. 07/845,203 filed Mar. 3, 1992 now U.S. Pat. No. 5,252,202.

BACKGROUND OF THE INVENTION

1. Field of the Invention

The present invention generally relates to a water treatment method and a water treatment device for muddy water used in water excavation engineering which is broadly employed in piling works for making ground formations and in underground continuous wall making works, and for industrial waste water discharged from various works. More particularly, the present invention relates to a method and device which can perform a regeneration treatment for the used muddy water in order to reuse it and a dehydration treatment for the waste muddy water and industrial waste water to reduce the weight.

2. Description of the Prior Art

Water excavation engineering has been well known to realize low noise and low vibration and is thus broadly employed in various civil construction works, such as piling work, underground continuous wall making work, water shield work, water drive work, and so on. For example, an earth drill method, a reverse circulation method, or BH method is used in combination with the water excavation engineering to perform the piling work, and a bucket method or a rotary method is used in combination with the water excavation engineering to perform the underground continuous wall making work.

In the water excavation engineering, natural muddy water, bentonite muddy water, polymer muddy water or the like, is used as a stabilizer for excavating the hole, a conveying fluid for excavated substance, and a substitute fluid for unhardened concrete supplied into the excavated space. Furthermore, the muddy water is often used for cooling an excavation machine and preventing the underground water from gushing into the excavated space. Therefore, the quality of the hardened concrete, the construction period, and the cost and safety of the work depends on the management and control of the muddy water under construction.

The management and control of the muddy water is carried out in response to various factors representing physical properties of the muddy water, such as viscosity, specific gravity, filtrated water amount, muddy layer thickness, sand percentage, pH and so on. Generally, the physical properties of the muddy water are so controlled as to keep the values of these factors within a predetermined range or less than a predetermined value. Particularly, the specific gravity of the muddy water should be lowered as much as possible while an excavated hole is stable in order to maintain construction quality at a desired level. It is desirable to keep the specific gravity of ordinarily used muddy water at no higher than about 1.2 during excavation and at no higher than about 1.1 during the pouring operation of unhardened concrete. When the specific gravity of the muddy water exceeds the above values, the quality of the muddy water becomes poor, which results in a lower excavation efficiency and involves slime formed in the concrete during the pouring operation of unhardened concrete. Accordingly, it is required that muddy particles such as slime, be removed from the muddy water as much as possible.

Conventionally, the muddy particles are removed from the muddy water by means of natural sedimentation or some kind of mechanical apparatus, such as a cyclone, to lower its specific gravity. However, they cannot exert a sufficient specific gravity lowering effect because they cannot remove fine particles of less than 74μ. In detail, the muddy particles and slime are removed by a commonly used apparatus using a combination of a vibration type sieve and a liquid cyclone whose classification point is about 74μ. This classification point represents the particle size when the contents included in the under flow and the over flow are at a ratio of 50% : 50%. In the above described sand separator using a combination of a vibration type sieve and a liquid cyclone, 50% of fine sand particles are included in the overflow. Thus such a conventional apparatus cannot remove fine sand and muddy particles of less than 74μ. When the ground which is excavated is mainly composed of fine sand, silt and clay, such fine sand, silt and clay particles remain in the muddy water and therefore the specific gravity of the muddy water cannot be lowered. The once used muddy water with the higher specific gravity can not be reused.

In conventional muddy water using excavation engineering, the muddy water with an undesirable high specific gravity, which includes much fine muddy particles caused by excavation work, is partially or wholly replaced by newly prepared water. That is, the muddy water with the higher specific gravity is disused. These conventional methods, however, provide some disadvantages, such as the replacing operation requires a relatively long time, resulting in extension of the construction period and cost for newly prepared water.

Various construction works generate much turbid water as industrial waste water, including a mixture of surface water, underground water or rain water, and sand, muddy particles, cement or the like, for example, turbid water generated by tunnel work; washed water by aggregate producing work; turbid water by rain water during ground formation work; turbid water by dredging and reclaiming works; waste water from a batcher plant; turbid water by pouring work of concrete; grout; turbid water by boring work; oil containing waste water leaked from construction machines; iron containing waste water by water replacement; and so on.

Since the waste muddy water is treated as industrial waste sludge, it should be subjected to proper treatment before final disposal in order to avoid environmental pollution. Furthermore, the above described industrial waste water should also be treated to avoid water pollution. This treatment, however, is complicated and results in an increase in cost.

Conventionally, the waste muddy water is subjected to a dehydration treatment using a filter cloth in order to decrease the weight of the waste sludge. The filter cloth, however, is easily blocked with fine muddy particles of the waste sludge and thus the dehydration ability becomes poor in a short time. Therefore the dehydration treatment can not effectively treat the waste muddy water.

On the other hand, the inventor provides a vertical type muddy water separator which can remove muddy particles from muddy water and industrial waste water generated by excavation work to decrease the specific gravity of the used muddy water and industrial waste water for reusing them, and can dehydrate the muddy water and industrial waste water to decrease its weight for final disposal. The muddy water separator comprises a stationary casing provided with an outlet port and an inlet port, a movable inner basket which is movably interposed in the stationary casing and whose cylindrical wall is not perforated, a cross shape arm arranged at an annular bottom of the basket, and a rotary drive shaft fixed at the cross point of the cross shape arm to pivotably suspend the basket within the stationary casing. When the rotary drive shaft is rotated at a high speed, the muddy water is supplied into the stationary casing through the inlet port. Muddy particles of the muddy water are sedimented and adhere to the inner cylindrical wall so that the solid part and the liquid part of the muddy water can be separated. This separator requires that the solid part from the basket wall be removed and temporarily stops the solid-liquid separation work whenever the solid part adhering to the basket wall reaches its maximum level.

Conventionally designed separators are not equipped with a sensory means for detecting the maximum level, and thus require skilled workers to sense the maximum level and to remove the solid part from the separator wall. However, since skilled workers do not always correctly detect the maximum level, the removing work may be untimely carried out. When the adhered solid part does not reach the maximum level, such untimely removal causes the work efficiency of the separator to be lowered on the other hand, when the adhered solid part exceeds the maximum level, the muddy water can not be treated by the separator and is directly discharged out of the water treatment system.

BRIEF SUMMARY OF INVENTION

It is an objective of the present invention to provide an improved water treatment method and device for muddy water and industrial waste water, which can overcome the above described problems.

Another objective of the present invention is to provide an improved water treatment method and device for muddy water and industrial waste water, which can remove muddy particles from the muddy water used by water excavation works to decrease the specific gravity of the used muddy water for reusing them.

A further objective of the present invention is to provide an improved water treatment method and device for muddy water and industrial waste Water, which can dehydrate the muddy water and industrial waste water to decrease its weight for final disposal.

A further objective of the present invention is to provide an improved water treatment device which can correctly sense an opportunity for the removal of the solid part adhered in the device.

To accomplish the above described objectives according to the first aspect of the present invention, an improved water treatment method for muddy water from water excavation engineering and/or industrial waste water comprises a first treatment process to perform a dehydration treatment of the waste muddy water and/or industrial waste water and a second treatment process to perform a regeneration treatment of the muddy water having a high specific gravity, where the muddy water is enriched with muddy particles caused by the water excavation engineering. These treatment processes are alternatively operated according to the kind of water to be treated and the final aim of its use. The first operation system includes a flocculation step for flocculating fine muddy particles contained in the waste muddy water and/or industrial waste water to form floccus; a solid-liquid separating step for separating the floccus to a solid part and a liquid part, which is operated in a first operation mode; a discharge step for discharging the liquid part through a filtering and clean water checking step; and a solid part treatment step for treating the solid part separated at the solid-liquid separating step. The second operation system includes a muddy water receiving step for receiving the muddy water from the excavation site; a solid-liquid separating step for separating the muddy water into a solid part and a liquid part, which is operated in a second operation mode; and a reusing step for reusing the separated liquid part which is free of the muddy particles caused by the solid-liquid separating step; and a solid part treatment step for treating the solid part separated at the solid-liquid separating step.

According to the second aspect of the present invention, an improved water treatment device for muddy water from water excavation engineering and/or industrial waste water comprises a first water reservoir for storing the muddy and waste water from the water excavation engineering and/or industrial works; a second water reservoir for storing the used muddy water which has a high density, as the muddy water has been enriched with muddy particles and other materials by the water excavation engineering; a flocculating unit for adding flocculant into the muddy water and/or industrial waste water fed from the first water reservoir to flocculate muddy particles contained in the muddy water and/or industrial waste water; a centrifugal separator which is alternatively operated in a first operation mode or a second operation mode by a switching valve, so that in the first operation mode the muddy water and/or industrial waste water fed from the flocculating unit is treated in order to separate the flocculated muddy water into a solid part and a liquid part, and in the second operation mode the used muddy water fed from the second reservoir is treated to remove the muddy particles from the used muddy water; a liquid cleansing unit to clean the liquid part fed from the centrifugal separator operated in the first operation mode; a third water reservoir for storing the treated water fed from the centrifugal separator operated in the second operation mode; and a solid part treatment unit for treating the solid part fed from the centrifugal separator operated in the first and second operation modes and/or the solid part adhered to the inner wall of the centrifugal separator.

The centrifugal separator used in the above method and device comprises a stationary casing; a movable inner basket is rotatably suspended in the stationary casing through a rotary drive shaft, the basket including a non perforated cylindrical wall and a wheel shaped bottom member; and an air nozzle, where the upper opening faces the wheel shaped bottom member. The wheel shaped bottom member includes an annular member; a substantially cross shaped arm is integrally formed in the annular member; and openings are defined between the cross shaped arm and the annular member, each inside wall of the openings being vertically inclined so as to facilitate the discharge of the solid part toward its bottom end.

According to another aspect of the present invention, the centrifugal separator may further comprise a means for sensing the maximum level of the solid part adhered to the basket wall, where the sensing means automatically stops the centrifugal operation of the basket and the muddy water feeding operation; and a means for removing the solid part adhered to the basket wall.

In the water treatment method and device according to the present invention, the muddy waste water and/or industrial waste water are added with flocculant to form muddy particle flocks, and these flocks are separated from the muddy waste water and/or industrial waste water by the centrifugal separator operated in the first operation mode. The separated flocks are condensed and solidified in the basket of the centrifugal separator. The separated liquid part of the waste water is filtered by the liquid cleansing unit to remove some impurities, and discharged out of this device.

Alternatively, the high density muddy water used by water excavation engineering is fed into the centrifugal separator operated in the second operation mode without any pretreatment. Muddy particles are separated from the high density muddy water and solidified by the centrifugal separator. The separated liquid part of the muddy water is stored in the third reservoir for reuse as stabilizing liquid for the water excavation engineering.

In both operation modes, the solid part separated by the centrifugal separator is fed to the solid part treatment unit to dehydrate it and form dehydrated cakes which can be easily disposed of as surplus oil used for ground construction along the sea side and the like.

The centrifugal separator according to the present invention can smoothly perform the solid-liquid separating operation without any stagnance. The bottom of the inner basket of the separator is formed with the openings defined between the cross shaped arm and the annular member, each inside wall of which is vertically widened toward its bottom end. In the openings, the solid part, such as condensed and solidified flocks and slime, easily fall down along the inside walls, which are downwardly widened, by the centrifugal force and the air flow jetted by the air nozzle. Since the solid part can be smoothly discharged out of the inner basket, the solid-liquid separating operation can be continued for a long period. Even when the openings are blocked with the solid part, the sensing means can detect the maximum level of the solid part stocked in the basket. This sensing means can automatically stop the centrifugal operation of the basket and the muddy water feeding operation. Furthermore, in the case where the centrifugal separator is equipped with a means for removing the solid part from the basket, the removing operation of the solid part may be automatically started in response to the sensing means.

Other features and advantages of the invention will be apparent from the following description used in connection with the accompanying drawings.

DETAILED DESCRIPTION OF THE PREFERRED EMBODIMENT

Figure 1:
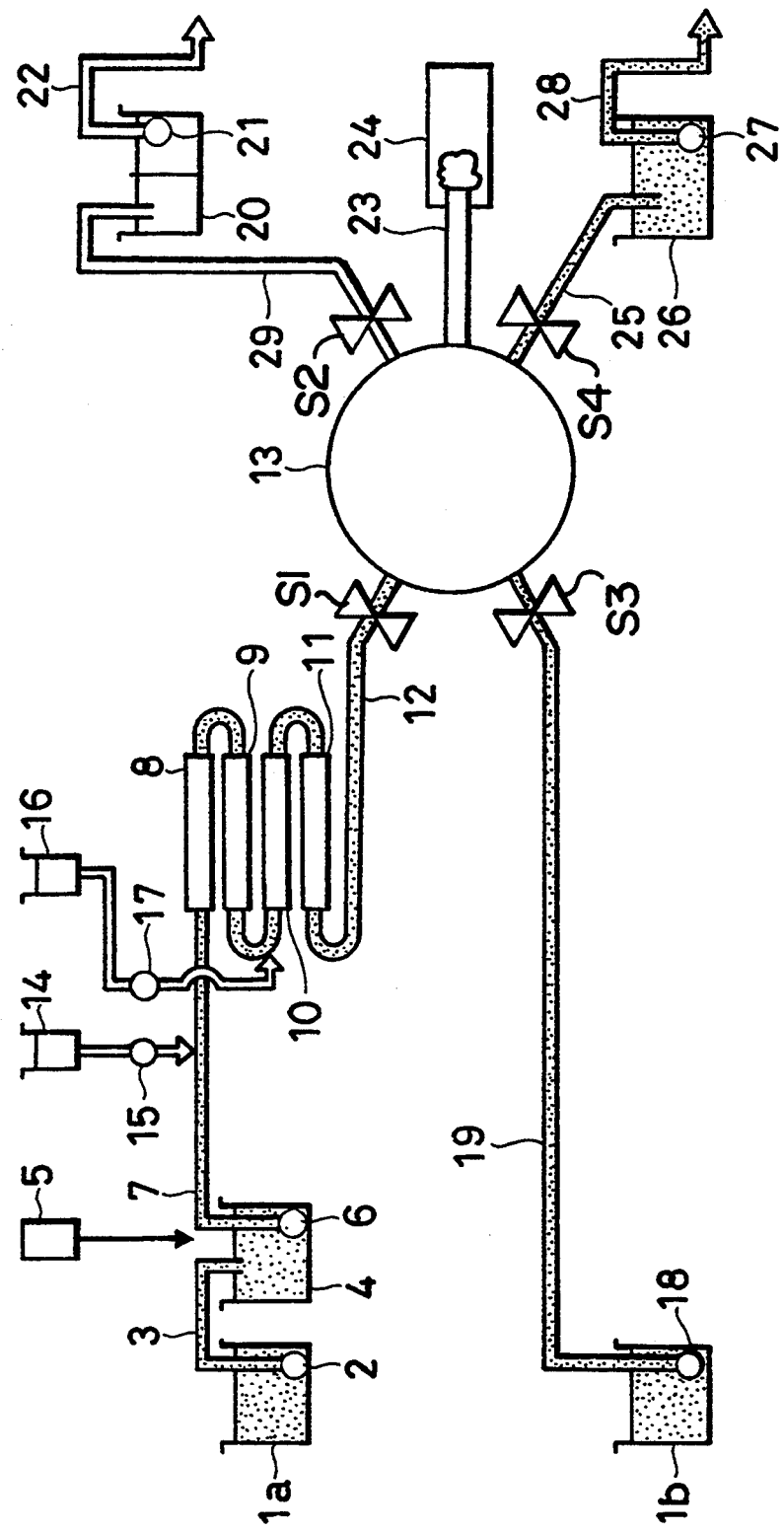
FIG. 1 is a schematic illustration showing the whole system of the muddy and waste water treatment method.

In FIG. 1, there is one embodiment shown of the muddy and waste water treatment method according to the present invention. This drawing shows two treatment systems, one of which is a dehydration treatment to decrease the water content or dehydrate muddy waste water from water excavation works and industrial waste water for final disposal, and the other is a regeneration treatment to lower the specific gravity of the muddy water once used in the water excavation works for reuse in the same or other water excavation works.

The dehydration treatment system includes a first reservoir 1a in which muddy and industrial waste water (hereinafter referred to as "waste water") is stored, and a fluid pump 2 set for feeding the waste water to a neutralization tank 4 through a pipe 3. The neutralization tank 4 is supplied with a predetermined amount of coagulant from a coagulant reservoir 5. In this embodiment, the coagulant is selected from a sulfate compound, PAC, calcium chloride, and the like. At the bottom of the neutralization tank 4, a fluid pump 6 is set and connected to a pipe 7. The pipe 7 is further connected to a first line mixer 8, a first reaction cylinder 9, a second line mixer 10, and a second reaction cylinder 11. The second reaction cylinder 11 is connected to a centrifugal separator 13 through a pipe 12. Furthermore, this system includes first and second flocculation units for adding high molecular flocculant to the pipe 7 to flocculate fine particles. The first flocculation unit is composed of a flocculant reservoir 14 and a pump 15 set before the line mixer 8, and the second flocculation unit is composed of a flocculant reservoir 16 and a pump 17 is set after the first reaction cylinder 9. The centrifugal separator 13 is connected to a liquid cleansing tank 20 through a pipe 29. In the cleansing tank 20, a pump 21 is set and connected to a pipe 22 for final disposal. Furthermore, separator 13 is connected to a solid part treatment unit 24 through a pipe 23.

On the other hand, the regeneration treatment system includes a second reservoir 1b in which muddy water once used in the water excavation works (hereinafter referred to as "used water") is stored, and a fluid pump 18 set for feeding the used water to the centrifugal separator 13 through a pipe 19. The separator 13 is connected to a treated water reservoir 26 for receiving the liquid part treated by the separator 13 through a pipe 25. This liquid part is fed to a reuse plant, not shown, through a pump 27 and a pipe 28 to prepare stabilizing water for the water excavation work.

The separator 13 is provided with a switching means, 51, 52, 53 and 54, for alternative connection to the pipes 12 and 29 of the hydration treatment system or the pipes 19 and 25 of the regeneration treatment system.

Figure 2:
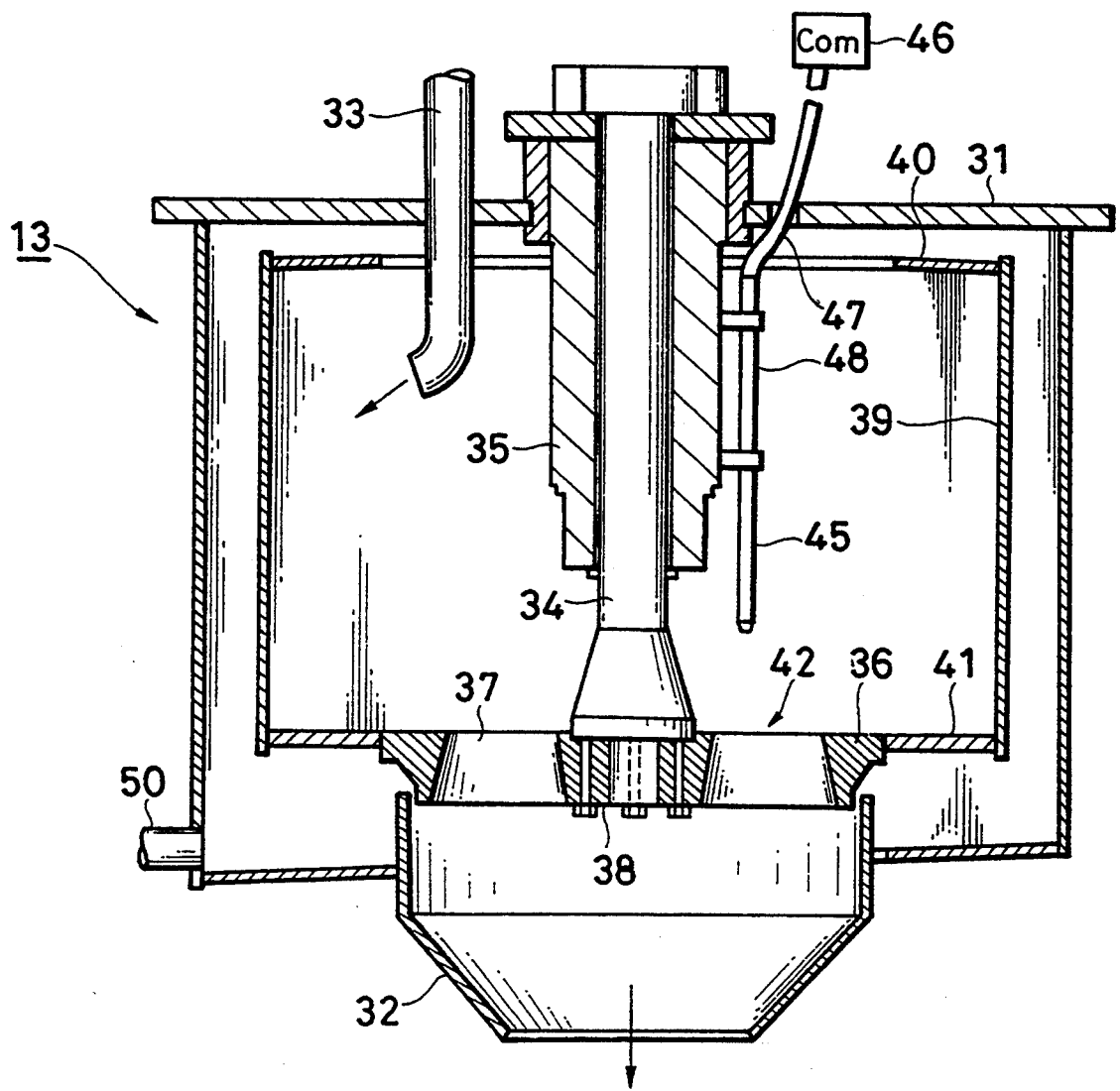
FIG. 2 is a vertical cross sectional view showing one embodiment of the muddy water separator according to the present invention.

FIG. 2 shows a vertical cross sectional view of one embodiment of the vertical type centrifugal separator 13 adapted for the muddy and waste water treatment method of the present invention. The centrifugal separator 13 comprises a stationary casing 31, and a movable inner basket 39 rotatably suspended in the stationary casing 31 to separate the waste water or used water into a solid part and a liquid part owing to the centrifugal force generated when the basket 39 is rotated.

The stationary casing 31 includes a cylindrical outer member, an upper lid and a bottom member formed with an outlet opening 32 for discharging the solid part. The cylindrical outer member is provided with an outlet pipe 50 adjacent to the bottom member so as to drain the liquid part overflowed from the inner basket 39. The upper lid is fixed with an inlet pipe 33 through which the waste water or used water is fed to the basket 39, and a bearing case 35 for rotatably receiving a rotary drive shaft 34. One end of the drive shaft 34 extends upwardly through the lid of the stationary casing 31 and is connected to a driving mechanism, such as an electro-controlled motor, not shown, and the other end is fixed to a wheel shaped bottom member 42 of the inner basket 39 so as to rotatably suspend the inner basket 39.

The inner basket 39 includes a non-perforated cylindrical wall made of a stainless steel, an upper annular plate 40, a lower annular plate 41, and the wheel shape bottom member 42.

Figure 3:
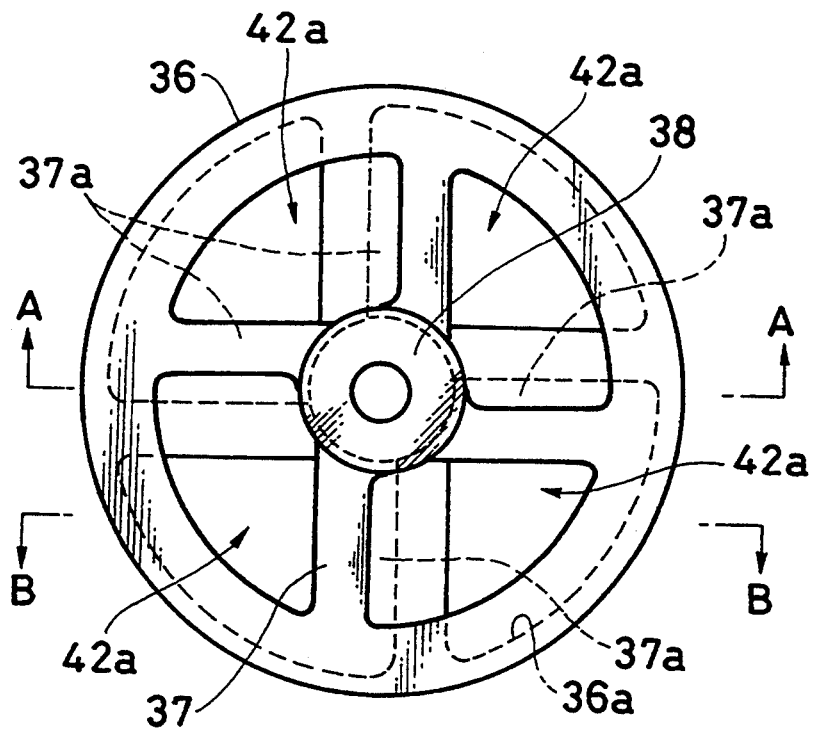
FIG. 3 is a plan view showing the wheel shaped bottom member of the separator shown in FIG. 2.
Figure 4:
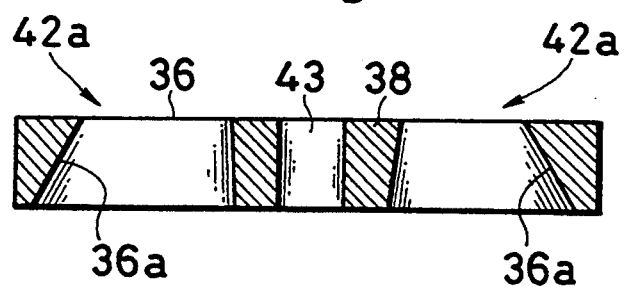
FIG. 4 is a cross sectional view taken along the line A—A in FIG. 3.
Figure 5:
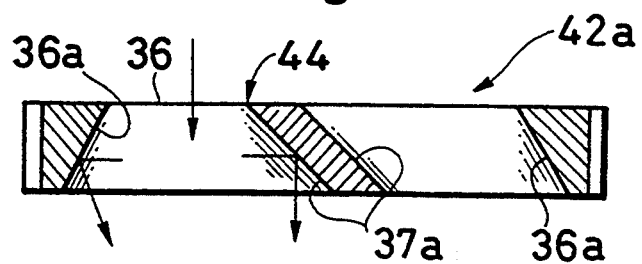
FIG. 5 is a cross sectional view taken along the line B—B in FIG. 3.
Figure 6:
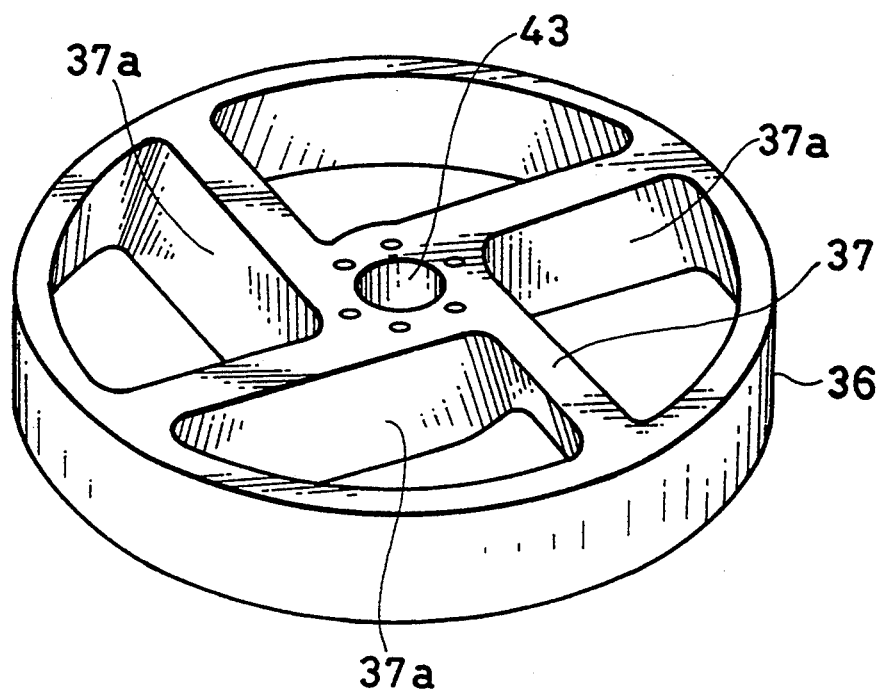
FIG. 6 is a perspective view showing the wheel shaped bottom member of FIG. 3.

FIG. 3 to FIG. 6 show the wheel shape bottom member 42 in detail. The bottom member 42 includes an annular member 36, a substantially cross shaped arm 37, and a center section 38 fixed to the drive shaft 34. As shown in FIG. 3, this annular member 36, cross shaped arm 37, and center section 38, define four fan shape openings 42a. FIG. 4 shows a vertical cross sectional view taken along the line A—A of FIG. 3. The annular member 36 includes four vertical inside walls 36a facing the fan shape openings 42a, which are inclined with respect to the axis of the bottom member 42. FIG. 5 shows a vertical cross sectional view taken along the line B—B of FIG. 3. Each arm of the cross shaped arm 37 includes vertically inclined walls 37a. In other words, the cross shaped arm 37 is formed similarly to a propeller fan used for ships, as shown in FIG. 6. In order to smoothly rotate the bottom member 42 about a center hole 43 in which the end of the drive shaft 34 is engaged, the arm sections of the cross arm 37 are concentrically arranged with respect to the center hole 43. The inclined angle of the inclined walls 36a and 37a is properly determined, preferably 30° to 45°. In this embodiment, the inclined wall 36a of the annular member 36 is 30° and the inclined wall 37a of the cross arm 37 is 45°. The arm section of the cross arm 37 is provided with a rounded corner 44 to prevent the cross arm 37 from sticking to long waste materials. The inclined wall 36a of the annular member 36 is widened toward the bottom end as shown in FIG. 4. The wheel shaped bottom member 42 is rotated in a clockwise direction in FIG. 3.

When the inner basket 39 is rotated, the solid part is separated from the waste water or the used water by centrifugal force and some of the solid part falls into the fan shaped openings 42a of the bottom member 42. The solid part is smoothly discharged downwardly along the inclined walls 36a and 37a during the rotation of the inner basket 39. This prevents the fan shaped openings 42a from becoming closed with the solid part.

Returning to FIG. 2, the separator 13 further comprises an air nozzle 45 for jetting air towards the fan shaped opening 42a. The air nozzle 45 is connected to an air compressor 46 through an air tube 47 and a metal pipe 48 for fixing the air nozzle 45 to the bearing case 35. This jetted air also facilitates the smooth discharge of the solid part from the fan shaped openings 42a.

Figure 7:
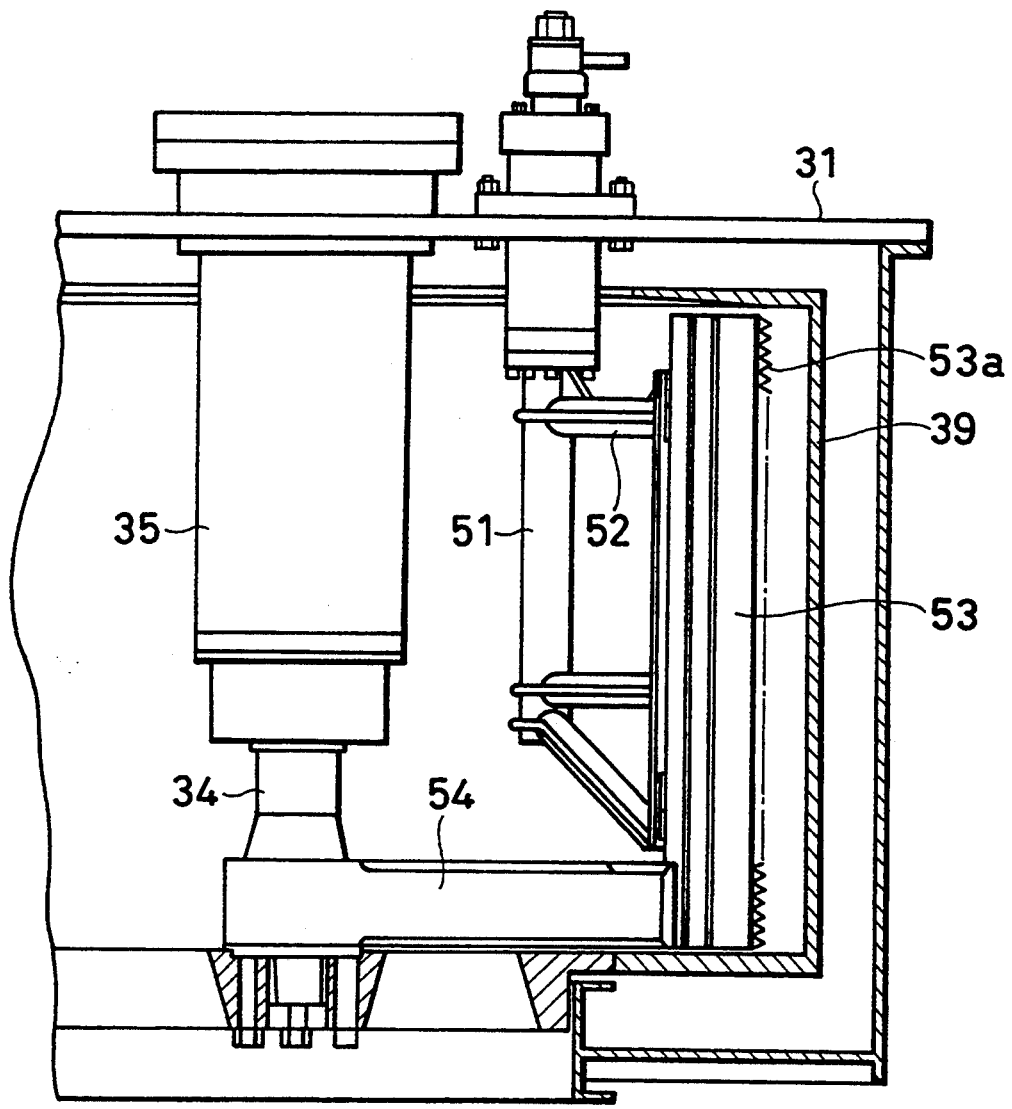
FIG. 7 is a partial cross sectional vertical view showing the muddy water separator equipped with a solid part removing means.
Figure 8:
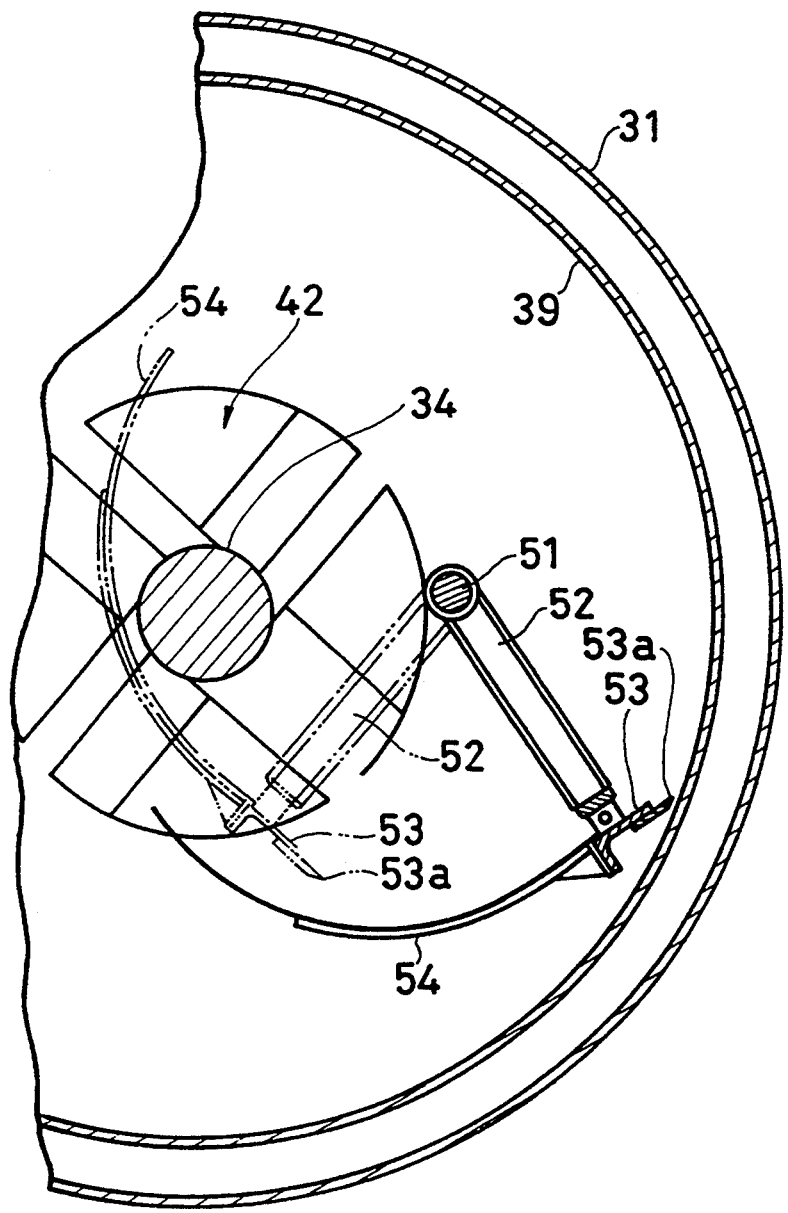
FIG. 8 is a partial sectional plan view showing the removing mechanism of FIG. 7.

FIG. 7 shows the separator 13 further provided with a solid part removing device. The removing device comprises a pivot 51 rotatably supported by the rod of the stationary casing 31, arms 52 horizontally extending from the pivot 51, and a scraper 53 fixed to the arms 52. The scraper 53 is provided with a toothed edge 53a facing the inner surface of the basket 39. The vertical length of the toothed edge 53a is slightly shorter than the internal height of the basket 39 so that the toothed edge 53a can fit within the basket 39. The removing device further comprises an arc shaped blade 54, as shown in FIG. 8 which is a partially sectional plan view of FIG. 7. The arc shaped blade 54 is fixed to the lower end of the scraper 53 so that the blade 4 can follow the scraper 53. The pivot 51 of the removing device can be rotated by a hydraulic actuating cylinder between its scraping position, represented by the rigid line, and its waiting position, represented by the phantom line as shown in FIG. 8, when the waste water or used water is fed into the separator 13. In the scraping position, the scraper 53 is positioned near the inner surface of the basket 39 to scrape the solid part which adheres to the inner surface of the basket 39. The solid part scraped by the scraper 53 is moved along the arc shaped blade 54 and discharged out of the separator 13 through the openings 42a by rotation of the basket 39.

The solid part removing device is not limited to this type of scraper, but any conventional mechanism can also be applied to this separator 13.

In thus constructed separator 13, the inner basket 39 is rotated at 700 to 800 rpm to apply a centrifugal force of 400 to 600 G to the waste water or used water, and the solid particles greater than the classification point of 10 micron are instantly precipitated in the inner basket 39 and compressed by the centrifugal force. At the same time, the liquid part overflows from the upper edge of the basket 39 and is drained through the outlet pipe 50. In the hydration mode, the liquid part is fed to the cleansing tank 20 through the pipe 29. In the regeneration mode the liquid part is fed to the treated water reservoir 26 through the pipe 25.

In the scraping operation, the inner basket 39 is rotated at about 300 rpm. The solid part adhering to the fan shaped openings 42a is subjected to a downward moving force by a combination of the centrifugal force and the inclined walls, and further to the air pressure jetted from the air nozzle 45. Therefore, the solid part can be smoothly discharged from the basket 39 at any time, regardless of a high speed or low speed of rotation. In other words, the separator 13 can perform the solid part removing operation whilst keeping the rotation of the separator 13 at a relatively high speed. This effect can reduce the period required for each scraping operation and can improve work efficiency. This embodiment is particularly effective for the muddy water, including sticky solid parts such as silt, which tends to adhere to the openings 42a.

Since the inner basket 39 is composed of the non-perforated cylindrical wall, the separator 13 can be effectively applied to any type of waste water and used water regardless of specific gravity or viscosity. Furthermore, the separator can be constructed in a relatively simple manner because its structure is simplified.

One preferred example of the hydration operation according to the present invention will be described in detail. As disclosed before, in order to reduce the water content of the muddy waste water or industrial waste water to facilitate final disposal, the hydration operation basically comprises the coagulation and/or flocculation step for adding the coagulant and/or flocculant to the waste water to form flocks of fine muddy particles, and the liquid-solid separation step for separating the waste water into its solid part and liquid part by the above described centrifugal separator. In this embodiment, the industrial waste water means various waste waters from land construction, dredging work, factories, various facilities and so on. The coagulation and/or flocculation causes the suspended particles in the waste water to form greater particles by coagulation and bridge formation of the suspended particles.

Figure 9:
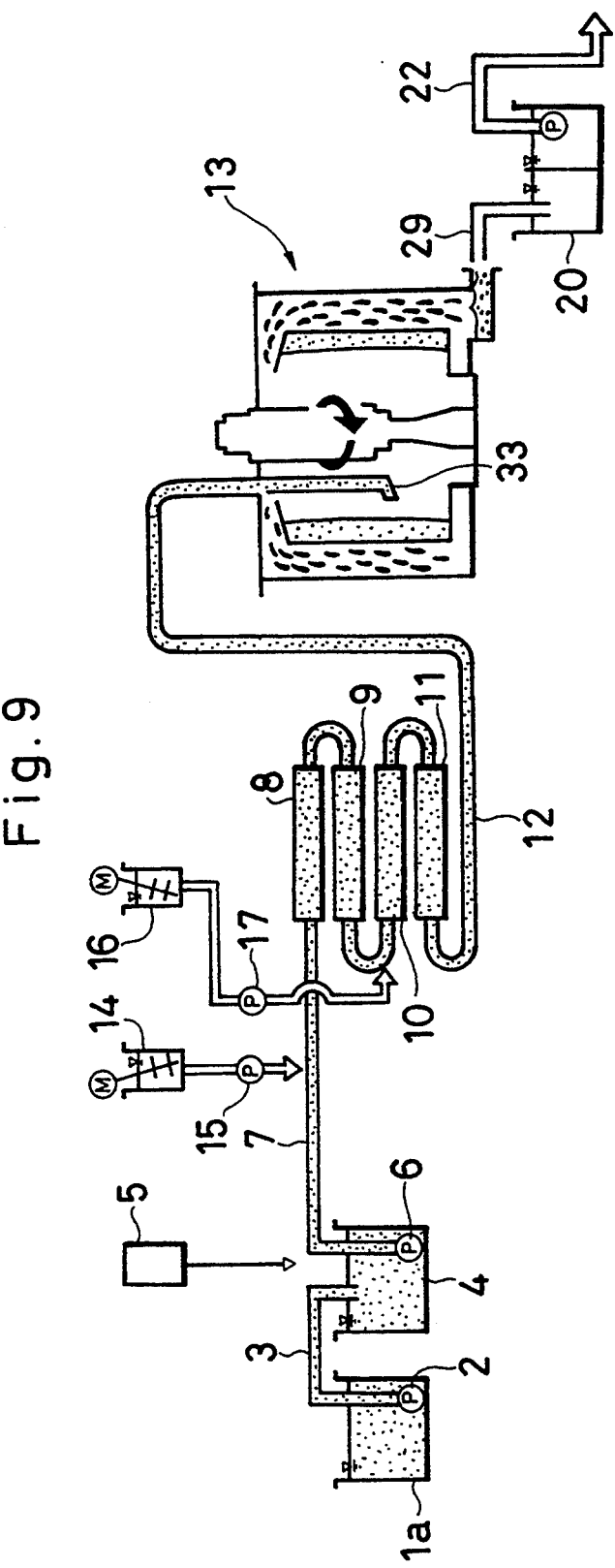
FIG. 9 is a schematic illustration showing the whole system of one treatment process according to the muddy and waste water treatment method of the present invention.
Figure 10:
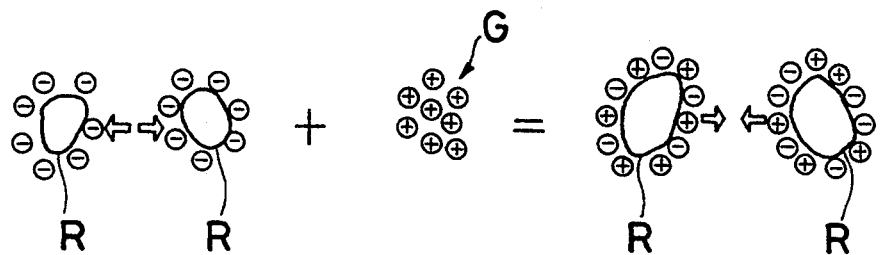
FIG. 10 is a schematic illustration showing a typical model for explaining coagulation.
Figure 11:
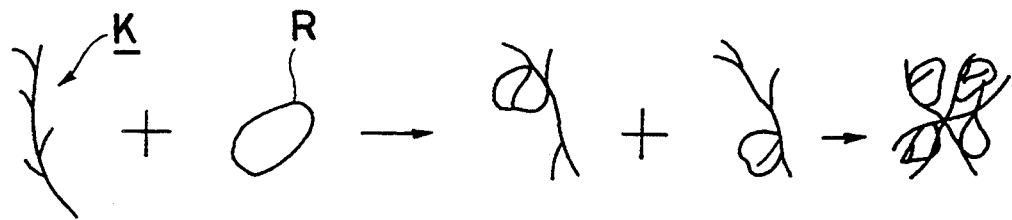
FIG. 11 is a schematic illustration showing a typical model for explaining flocculation.

FIG. 9 shows one typical process of performing the dehydration operation using the above described centrifugal separator 13. In this process, the waste water is fed to the first reservoir 1a, and the waste water is then fed to the neutralization tank 4 through the pipe 3 by the feeding function of the fluid pump 2 set in the first reservoir 1a. In the neutralization tank 4, the waste water is added to a predetermined amount of sulfate compound supplied from the coagulant reservoir 5 so that the waste water is neutralized and coagulated. FIG. 10 shows an illustration which explains this coagulation. Fine particles R with negative charges are neutralized by the coagulant G with positive charges to weaken their repulsion. Thus poorly repulsive particles tend to gather and absorb each other. The coagulated water flows through the pipe 7 by the feeding function of the fluid pump 6 set in the neutralization tank 4. The coagulated water is subjected to the first addition of high molecular inorganic flocculant supplied from the flocculant reservoir 14 by the feeding function of the pump 15. The waste water is subjected to mixing by the line mixer 8 and reaction by the first reaction cylinder 9. After this, the waste water is secondarily supplied with the high molecular flocculant fed from the reservoir 16 by the pump 17. The high molecular flocculant is properly selected from a cationic type, nonionic type, anionic type, and the like in accordance with the chemical and physical properties of the waste water. After the second mixing and reaction by the line mixer 10 and the second reaction cylinder 11, the waste water is fed into the centrifugal separator 13 through the pipe 12. By the repetition of the mixing and reaction the fine particles, smaller than 10 microns, are absorbed and bridge-formed to increase the flocculation. This phenomenon is shown in FIG. 11. One branch of the high molecular flocculant K is absorbed by one of the muddy particles R. Another branch of the absorbed flocculant is bridged to an another. This absorption and bridging operation is repeated within a relatively short period by the mixing and reaction steps to form flocks.

The centrifugal separator 13 is switched to the hydration treatment mode by any proper switching means, such as a switching valve. The flocks of waste water are separated from the liquid part of the waste water by the centrifugal force of the inner basket 39 rotated in the separator 13. The flocks are further gathered and compressed to the cylindrical wall of the basket 39. The liquid part separated by the separator 13 is fed into the cleansing tank 20 through the pipe 29. In the cleansing tank 20, the liquid is added to some additives, such as pH control agent, SS treatment agent as required, and filtered. Thus treated liquid is discharged to a public sewer system, river, sea or the like as final disposal through the pipe 22.

The compressed flock; i.e., the solid part separated from the waste water, is fed to the solid part treatment unit 24 through the pipe 23. In the solid part treatment unit 24, the solid part is treated to form a dehydrated cake which can be handled as reusable soil different from industrial waste sludge. On a practical site, the dehydrated cake is dried by the sun and mixed with natural soil or sand. Since the dehydrated cake in the unit 24 appears as natural soil, not fluid, the dehydrated cake can be easily handled and transported.

Figure 12:
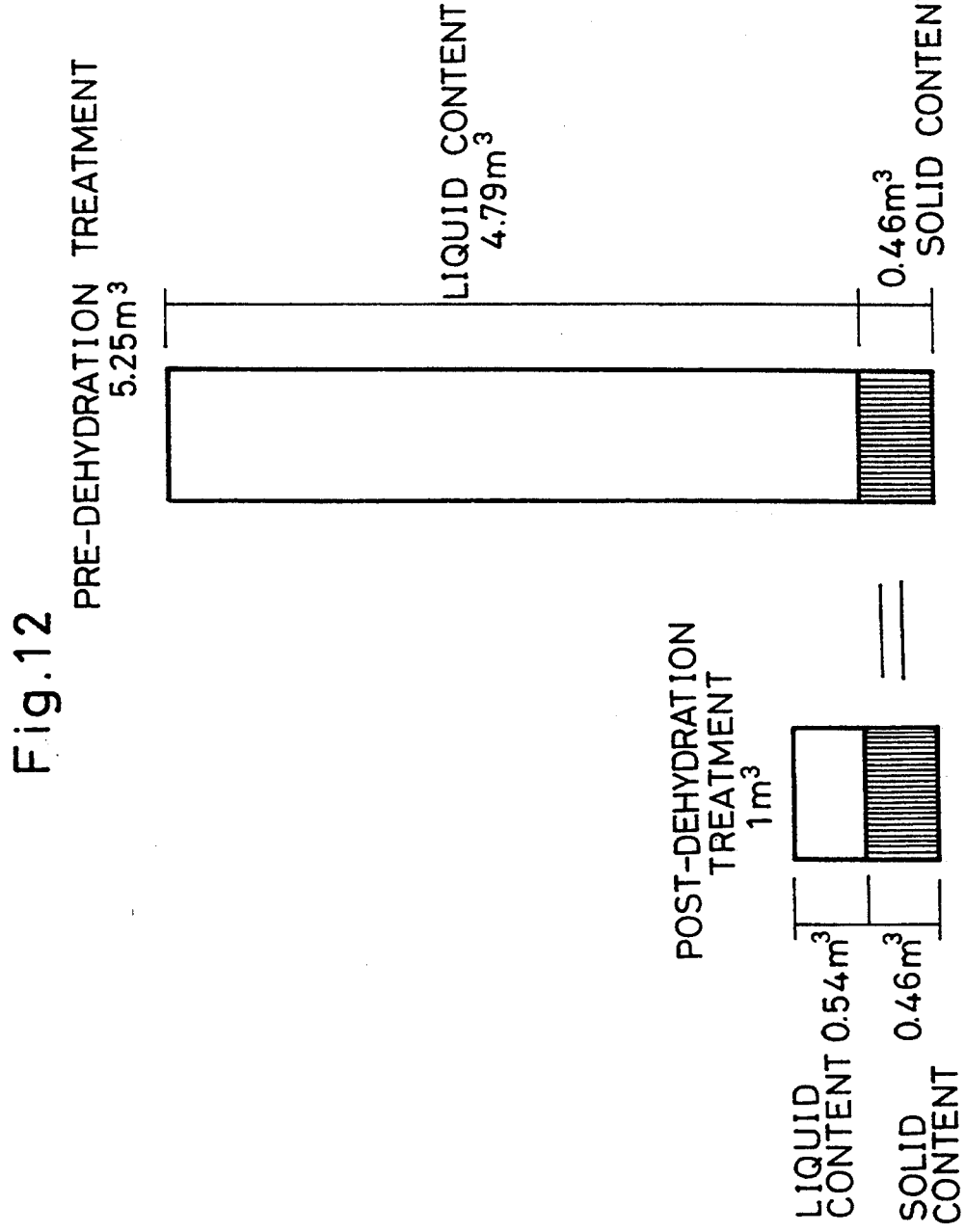
FIG. 12 is a graphical representation showing a comparison of the content between the pre-dehydration treatment and the post-dehydration treatment according to the present invention.

FIG. 12 shows the comparison data of liquid content in the waste water between the pre-dehydration treatment and the post-dehydration treatment. The waste water of 5.25 $m^2$ with specific gravity of 1.15 was reduced to 1 $m^2$ by the dehydration treatment. That is, the liquid part of 4.79 $m^2$ was reduced to 0.54 $m^2$ whilst keeping the solid content of 0.46 $m^2$ at a constant level.

Figure 13:
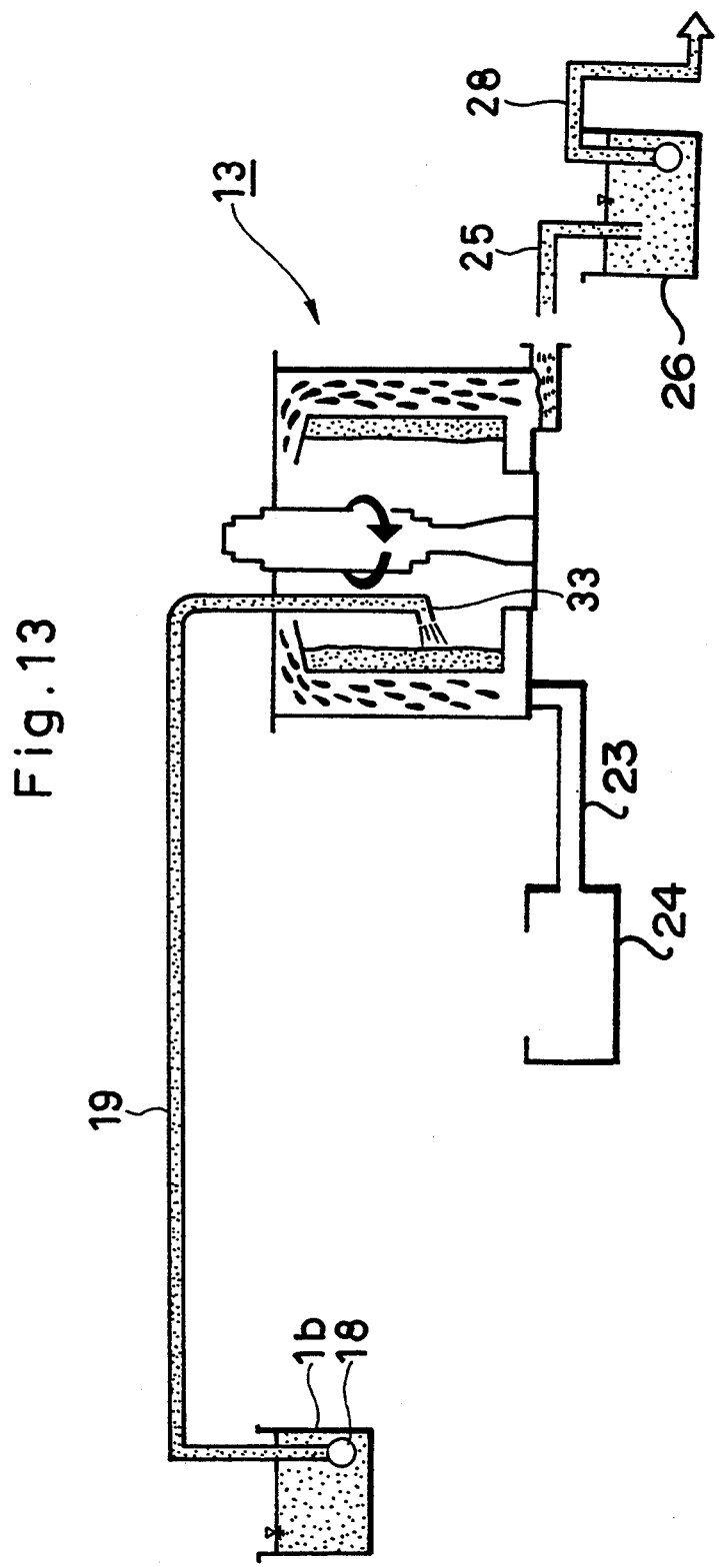
FIG. 13 is a schematic illustration showing the whole system of the other treatment process according to the muddy and waste water treatment method of the present invention.

One preferred example of the regeneration treatment according to the present invention will be described in detail. As disclosed before, in order to reuse the used muddy water which has a high specific gravity, this regeneration treatment removes muddy particles greater than 10 micron from the used muddy water. FIG. 13 shows one typical process used to perform the regeneration treatment using the above described centrifugal separator 13. In this process, the muddy water once used in the water excavation works as stabilizing liquid and mixed with slime is fed to the second reservoir 1b, and fed to the centrifugal separator 13 through the pipe 19 by the fluid pump 18 set in the second reservoir 1b. The centrifugal separator 13 is switched in the regeneration treatment mode by a proper switching means, such as a switching valve. The muddy particles and slime in the used water are separated from the liquid part of the used water by the centrifugal force of the inner basket 39 rotated in the separator 13. The muddy particles and slime are further gathered and compressed to the cylindrical wall of the basket 39. The liquid part separated by the separator 13 is fed into the treated liquid reservoir 26 through the pipe 25. Then the treated liquid is fed to a reuse plant, not shown, through the pump 27 and the pipe 28 to prepare stabilizing liquid for the water excavation work.

The compressed solid part separated from the used water is fed to the solid part treatment unit 24 through the pipe 23 and treated in the same manner as the dehydration treatment mode.

The solid part removing device shown in FIG. 7 is actuated at regular intervals before the solid part in the basket 39 reaches the maximum level. Alternatively, the removing device may be actuated in response to a signal from a sensing means which can detect the maximum level or a predetermined level of the separator 13. The basket 39 is rotated at 100 to 300 rpm for the solid part removing operation.

The effect caused by the regeneration treatment using the above described centrifugal separator 13 is shown in the following table.

TABLE 1

|  | 1 | 2 | 3 | 4 | 5 | 6 | 7 | Ave. |
|---|---|---|---|---|---|---|---|---|
| S.G before Treatment | 1.150 | 1.075 | 1.080 | 1.145 | 1.170 | 1.040 | 1.110 | 1.110 |
| S.G after Treatment | 1.050 | 1.050 | 1.050 | 1.040 | 1.050 | 1.034 | 1.050 | 1.046 |

S.G: specific gravity
Ave.: average

Table 1 shows the comparative data between the specific gravity of the used muddy water samples before and after the regeneration treatment. Comparing the average values 1.110 vs 1.046, the regeneration treatment according to the present invention can effectively reduce the specific gravity of the used muddy water to the required level.

Figure 14:
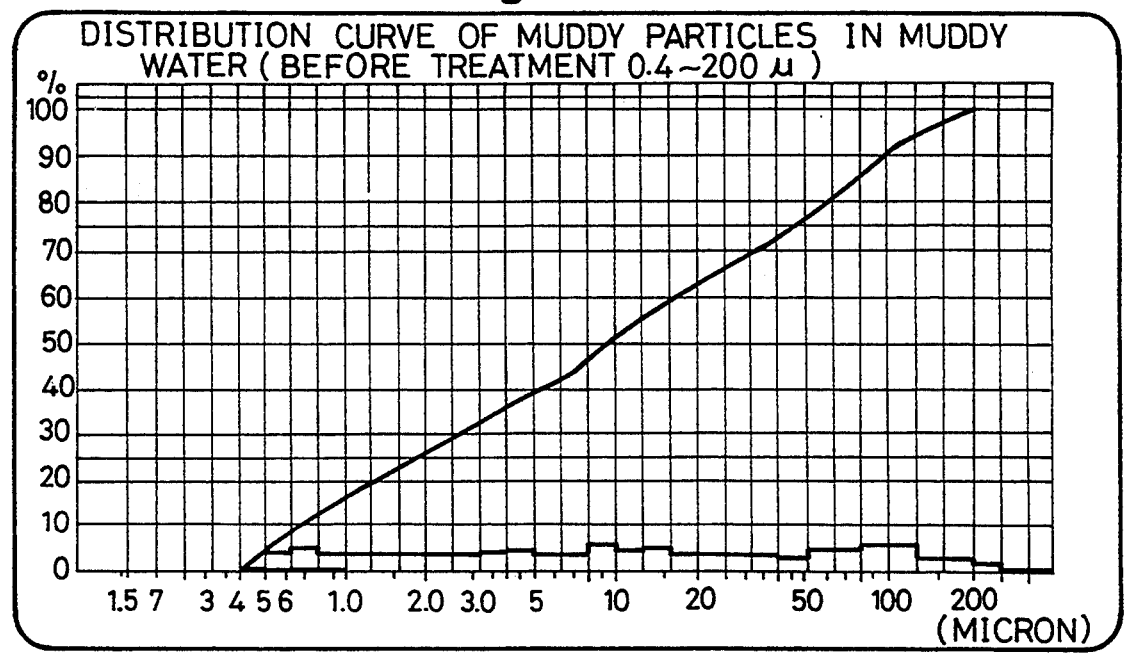
FIG. 14 is a graphical representation showing a distribution curve of muddy particles in muddy water before treatment according to the present invention.
Figure 15:
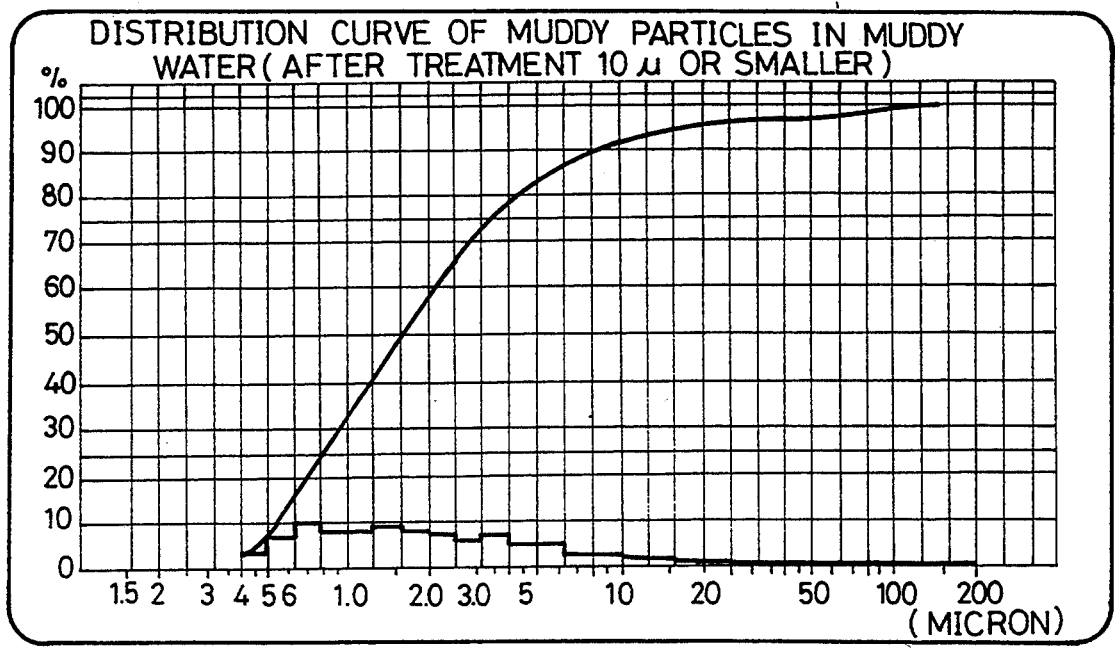
FIG. 15 is a graphical representation showing a distribution curve of muddy particles in muddy water after treatment according to the present invention.

FIG. 14 shows the distribution curve of the muddy particles in the used water before the regeneration treatment, and FIG. 15 shows the same curve after the treatment. The particles in the used water after the treatment almost belong to the range not greater than 10 microns. The particles greater than 10 microns are almost all removed by the centrifugal separator 13 of the present invention. This means the separator 13 possesses a regeneration treatment performance of 10 microns.

Figure 16:
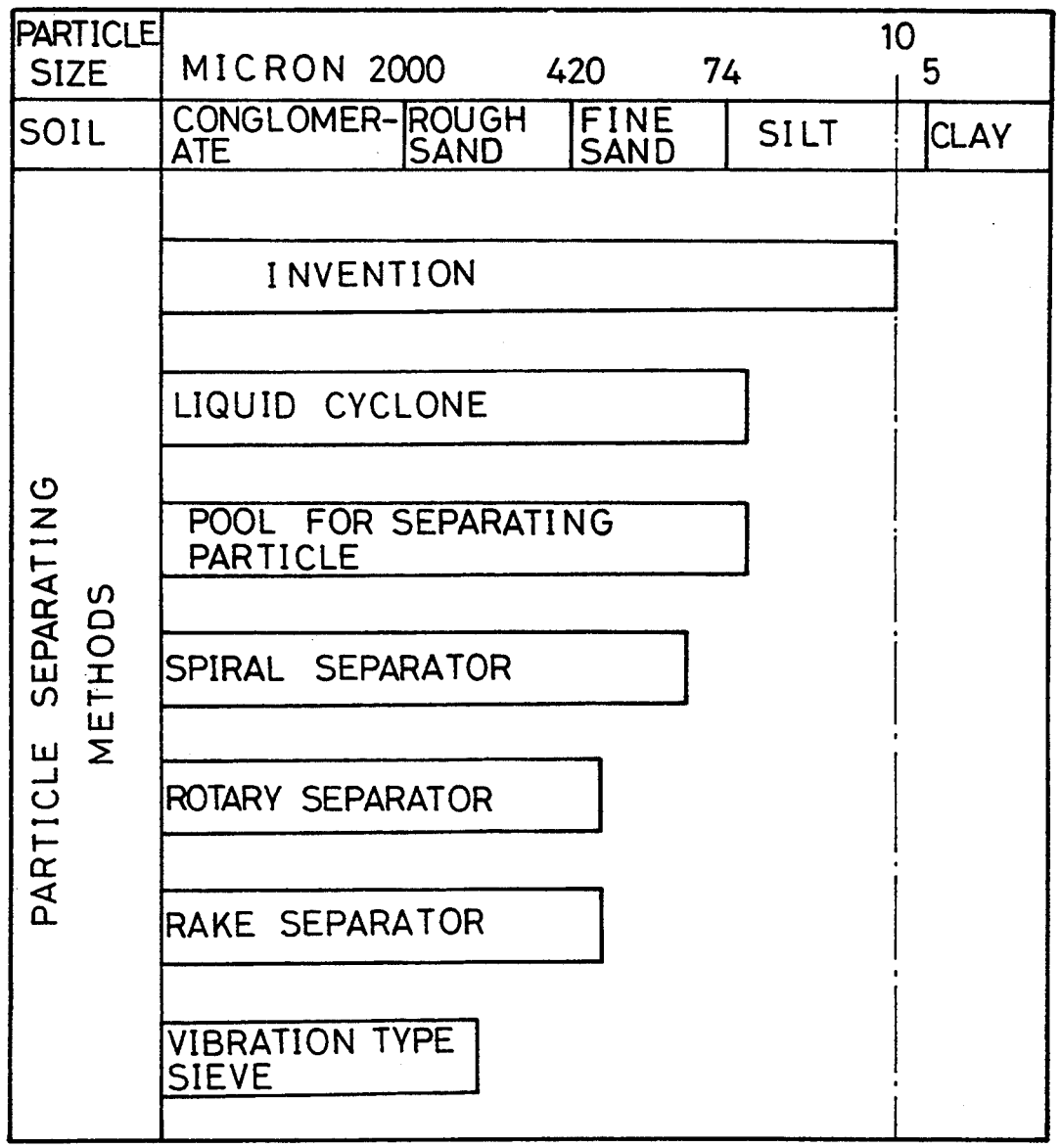
FIG. 16 is a graphical representation showing the comparative data of various particle separating methods.

FIG. 16 shows the comparison between the separator according to the present invention and other various conventional separating methods. The invention can be applied to an extremely wide range of particle sizes, regardless of whether fine sand or silt is used. The water content of the treated solid part is 20 to 30%.

Figure 17:
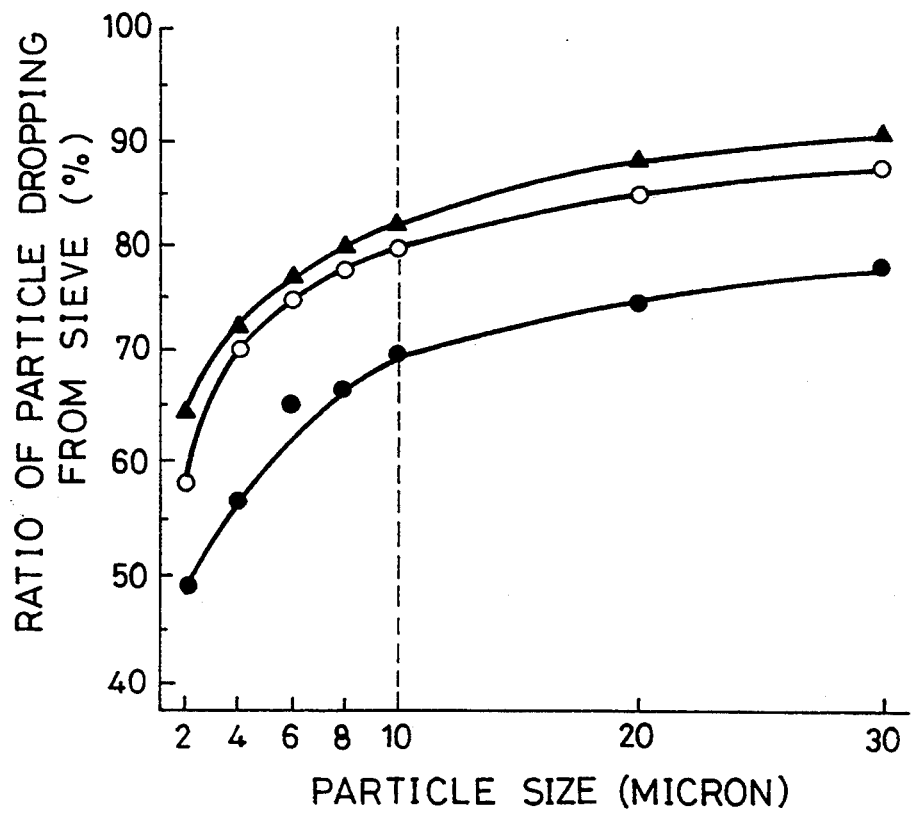
FIG. 17 is a graphical representation showing a distribution curve of the particle size of bentonite.

FIG. 17 shows the distribution curves of the particle size of bentonite included in the used water. According to this drawing, the particle size of the bentonite almost all is 10 microns or smaller. Since the separator according to the present invention removes the muddy particles greater than 10 microns such as slime from the used water, the effective component; i.e., bentonite, can remain in the treated water to be reused for the water excavation work. If the used water is not subjected to the treatment of the present invention, the used water having a higher specific gravity will be almost all wasted and newly prepared stabilizing liquid will be continuously required. The water treatment system according to the present invention can save the cost of the water excavation work.

Although the separator 13 removes the particles greater than 10 microns, the particles smaller than 10 microns will accumulate to increase the specific gravity of the used water to an unrequired level. This used water will be subjected to the dehydration treatment of the present invention and finally become waste.

Figure 18:
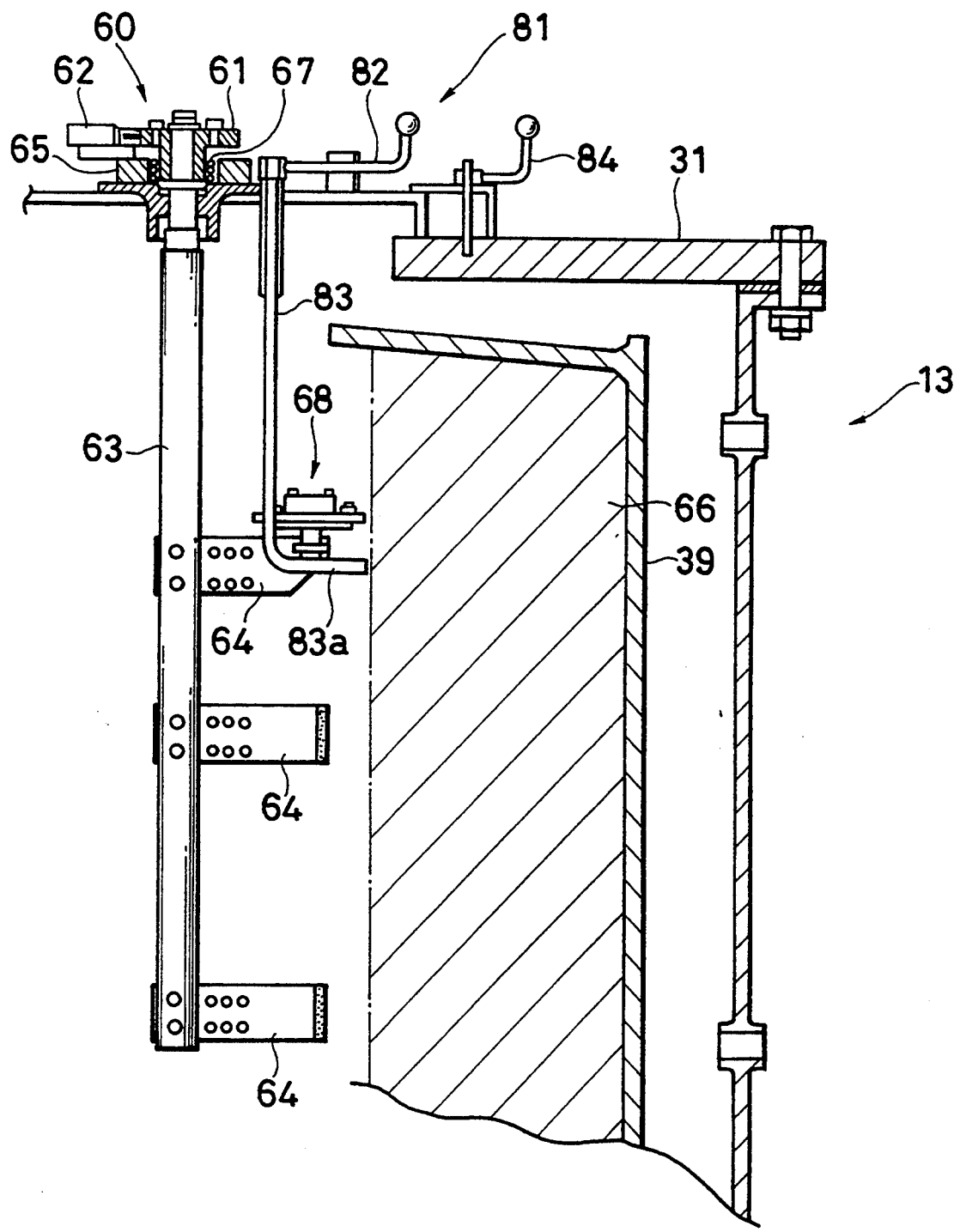
FIG. 18 is a partial cross sectional vertical view showing another embodiment of the muddy water separator equipped with a maximum level sensing means.
Figure 19:
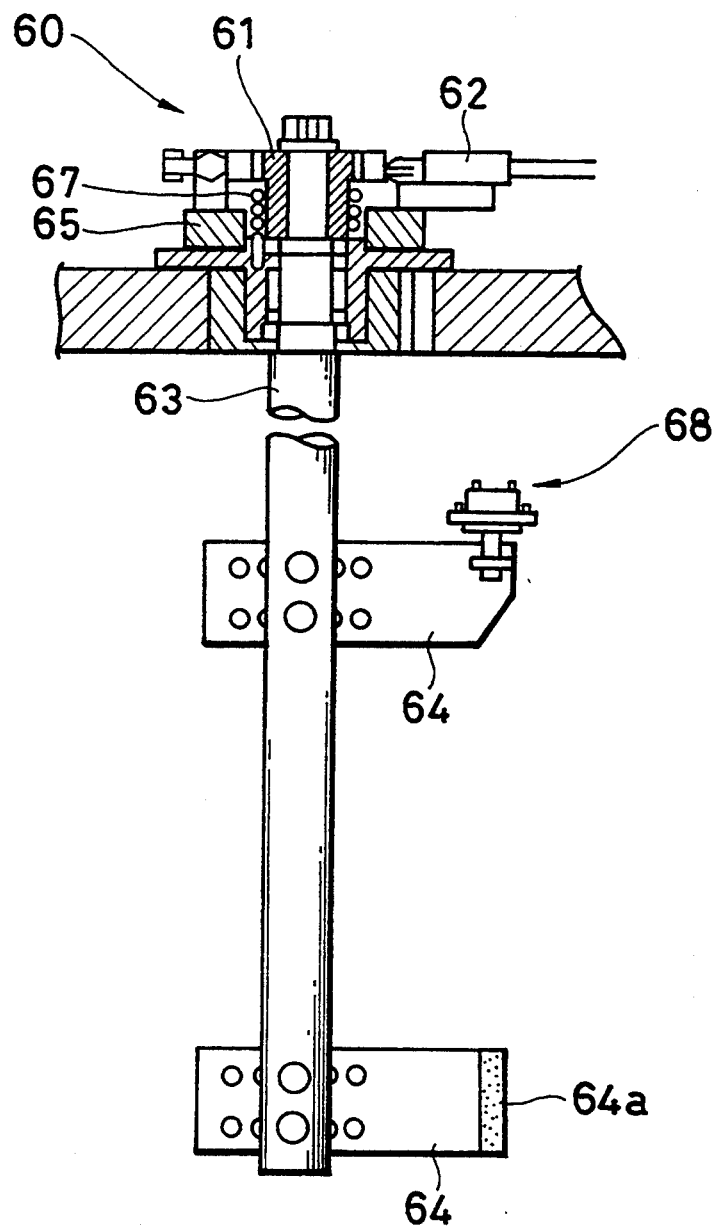
FIG. 19 is an enlarged sectional view showing the maximum level sensing means shown in FIG. 18.
Figure 20:
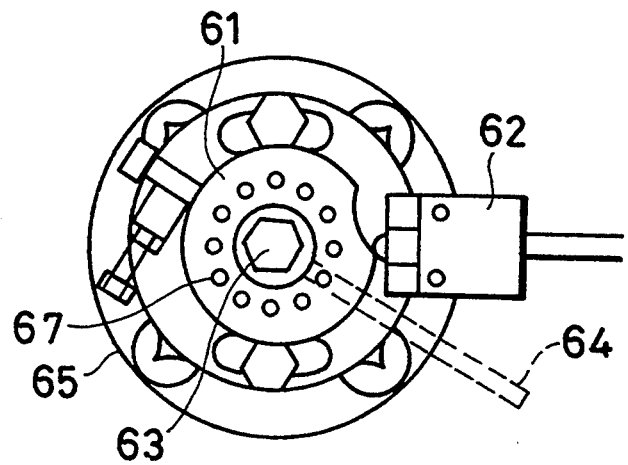
FIG. 20 is a plan view showing the maximum level sensing means shown in FIG. 18.

FIG. 18 is a partially enlarged sectional view showing one modified embodiment of the centrifugal separator 13 which is equipped with a sensing means 60 for detecting a predetermined maximum level of the solid part accumulated in the inner basket 39. FIG. 19 and FIG. 20 show this sensing means per se in its elevational and plan view. In FIG. 18 to FIG. 20, the same reference numbers denote the same or corresponding elements or parts as the centrifugal separator 13 shown in FIG. 2 so that the same explanation is not repeated.

The sensing means 60 comprises a rotary switch 61 set on the upper surface of the stationary casing 31, a limit switch 62 which is alternatively turned on and off in response to the rotation of the rotary switch 61, a center rod 63, one end of which is connected to the rotary switch 61 and the other end of which extends into the inner basket 39, and a plurality of sensor plates 64 fixed to the center rod 63 in a vertical direction. The rotary switch 61 is rotatably mounted on a support member 65 fixed on the upper surface of the stationary casing 31. The top end of the center rod 63 is fixed to the rotary switch 61 through a center opening formed in the support member 65 so that the rotary switch 61 is rotatively actuated by rotation of the rod 63.

The sensor plates 64 are formed in an oblong shape extending in a horizontal direction, and further integrally provided at their top end with a carbide tip 64a. It is preferable that at least two of the sensor plates 64, as shown in FIG. 18 and FIG. 19, are set to correctly detect the maximum level even when the solid part 66 accumulated in the inner basket 39 is irregularly adhered to the basket wall or deposited in the lower section of the basket 39.

The rotary switch 61 is always set in a predetermined direction by a spring 67 interposed between the rotary switch 61 and the support member 65 to avoid the rotary switch 61 from interfering with the limit switch 62.

One of the sensor plates 64, the upper sensor plate in FIG. 18, is provided with a misoperation preventing means 68 for preventing the sensing means 60 from misoperating. When some droplets from the muddy water fed into the separator 13, sometimes hit the sensor plates 64, the sensing means 60 is actuated in response to this incorrect situation.

Figure 21:
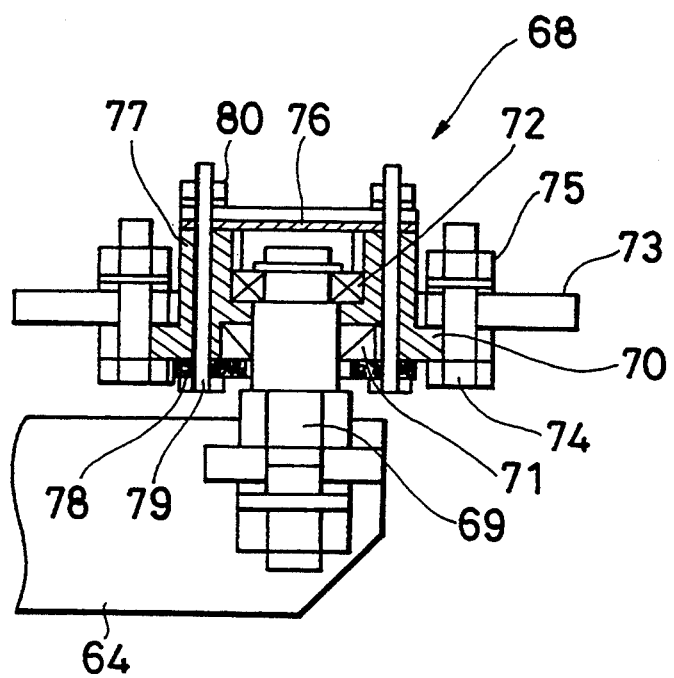
FIG. 21 is an enlarged cross sectional view showing a misoperation protecting means which is associated with the maximum level sensing means shown in FIG. 18.

FIG. 21 shows one typical structure of the misoperation preventing means 68. This means 68 comprises a support member 69 fixed to the right end of the sensor plate 64, a bearing case 70 rotatably supported by the support member 69 through an annular sealing member 71 and bearings 72, and a sensor element 73 fixed to the bearing case 70 through bolts 74 and nuts 75. The bearing case 70 is further provided with an upper plate 76 through a packing sheet 77 and a lower plate 78, and these upper and lower plates 76 and 78 are fixed to the bearing case 70 by long bolts 79 and nuts 80.

Referring to FIG. 18, the separator 13 further includes a manual sensing means 81 for detecting the maximum level of the accumulated solid part 66. This manual sensing means 81 is composed of a handle 82 and a rod 83, one end of which is connected to the handle 82 and the other end 83a is angled substantially at 90° toward the cylindrical wall of the inner basket 39. The rod 83 is pivotably set to the lid of the stationary casing 31. The angled section 83a is slightly longer than the sensor plates 64 so that the angled section 83a will be brought into contact with the solid part 66 when the accumulated solid reaches the maximum level. The reference number 84 denotes a release lever for dismounting the sensing means 60 to check, cleanse and change the sensor plates 64, the misoperation protecting means 68 and the manual sensing means 81.

The operation of the sensing means 60 will be described in detail. When at least one of the carbide tips 64a of the sensor plates 64 is in contact with the solid part 66 accumulated in the basket 39 rotating in the stationary casing 31 of the centrifugal separator 13, the rotating force of the basket 39 is transmitted to the center rod 63 through the sensor plate 64. By this rotating force, the rotary switch 61, integrally fixed to the rod 63, is also rotated against the urging force of the spring 67 to turn on the limit switch 62. The turn-on signal of the limit switch 62 is sent to the drive unit of the rotary drive shaft 34 of the separator 13 to decrease the rotational speed of the shaft 34 to the low speed rotation mode, for example 100 to 300 rpm, and simultaneously to the fluid pumps 2 and 6 when the separator 13 is operated in the dehydration treatment mode, or the fluid pump 18 when the regeneration treatment mode to stop the water feeding operation of the waste or used muddy water into the basket 39 through the inlet pipe 33. Then the solid part removing device shown in FIG. 7 and FIG. 8 is set to the scraping position, where the scraper 53 starts to scrape the solid part 66 adhered to the cylindrical wall of the inner basket 39. When the scraping operation of the removing device is completed, the rotary switch 61 is returned to its initial position, where the rotary switch 61 is isolated from the limit switch 62, by the urging force of the spring 67.

The misoperation preventing means 68 will prevent the sensing means 60 from misoperating on account of droplets from the muddy water fed into the separator 13. When the droplets hit this means 68, the sensor element 73 is rotated by the force of the droplets to absorb this force. On the other hand, when the solid part 66 nearly reaches or exceeds the maximum level, the sensor element 73 of the means 68 is repeatedly subjected to a greater hitting force, which can not be absorbed by the rotation of the sensor element 73. Thus the sensing means 60 can correctly sense the maximum level, representing the correct time to remove the solid part 66 from the inner basket 39.

The maximum level can be sensed by the manual sensing means 81 shown in FIG. 18. An operator manually operates the handle 82 of the means 81 to check whether the angled section 83a is in contact with the solid part 66 or not. Although this manual sensing means 81 is relatively simple, the operator must often manually operate the handle 82. In this manual sensing mode, the solid part removing operation is also initiated by the operator.

As disclosed above, the water treatment method and device according to the present invention can alternatively perform the dehydration treatment of the waste muddy water and/or industrial waste water for final disposal, or the regeneration treatment of the muddy water once used in the water excavation work for reuse in the same or other works by using the same device in a relatively easy manner.

In the dehydration treatment, the muddy waste water and/or industrial waste water are added with flocculant to make flocks of fine muddy particles smaller than 10 microns, and these flocks are separated from the muddy waste water and/or industrial waste water by the centrifugal separator. The separated flocks are condensed and solidified in the basket of the centrifugal separator to form dehydrated cakes which can be easily disposed of as natural soils. The separated liquid part of the waste water is filtered by the liquid cleansing unit to remove some impurities, and are discharged from this device as waste water.

Alternatively, in the regeneration treatment, the high density muddy water once used in the water excavation works is fed into the centrifugal separator to remove the muddy particles greater than 10 microns from the high density muddy water. Since the separated liquid mainly includes fine particles, such as grout, which are smaller than 10 microns, the separated liquid can be reused as a desirable stabilizing liquid for the water excavation engineering.

In both operation modes, the solid part separated by the centrifugal separator is fed to the solid part treatment unit to be dehydrated and then form dehydrated cakes which can be easily disposed of as surplus soil used for ground construction along the sea side and the like.

The centrifugal separator according to the present invention can smoothly perform the solid-liquid separating operation without any stagnance. The bottom of the inner basket of the separator is formed with the openings defined between the cross shaped arm and the annular member, each inside wall of which is vertically widened toward its bottom end. In the openings, the solid part, such as condensed and solidified flocks and slime, easily fall down along the inside walls, which are downwardly widened, by the centrifugal force and the air jetted from the air nozzle. Since the solid part can be smoothly discharged out of the inner basket, the solid-liquid separating operation can be continued for a long period. Even when the openings are blocked with the solid part, the sensing means can detect the maximum level of the solid part stocked in the basket. This sensing means can automatically stop the centrifugal operation of the basket and the muddy water feeding operation. Furthermore, in the case where the centrifugal separator is equipped with an electro-actuating means for removing the solid part from the basket, the removing operation of the solid part may be automatically started in response to the sensing means. The misoperation preventing mean associated with the sensing means can prevent the sensing means from misoperating on account of water droplets.

Needless to say, the dehydration treatment system and the regeneration treatment system can be independently arranged to perform both treatments using the same two separators at the same occasion in the case of a great and continuous amount of treatment.

Although the invention has been described in its preferred form with a certain degree of particularity, it is understood that the present disclosure of the preferred form has been changed in the details of construction and the combination and arrangement of parts may be resorted to without departing from the spirit and scope of the invention as hereinafter claimed.

What is claimed is:

1. A water treatment method for waste muddy water from water excavation engineering and/or industrial waste water and used muddy water once used in water excavation works comprising;
   a first treatment process performing a dehydration treatment of the waste muddy water and/or industrial waste water which includes a flocculating step for flocculating fine muddy particles contained in the waste muddy water and/or industrial waste water to form floccus; a first solid-liquid separating step for separating the floccus to a solid part and a liquid part, which is operated in a first operation mode; a discharging step for discharging the liquid part through a filtering step; and a solid part treatment step for dehydrating the solid part separated at the first solid-liquid separating step; and
   a second treatment process performing a regeneration treatment of the used muddy water which has a higher specific gravity than the waste muddy water and is enriched with muddy particles by the water excavation works which includes a used muddy water receiving step for receiving the used muddy water from an excavation site; a second solid-liquid separating step for separating the used muddy water to a solid part and a liquid part, which is operated in a second operation mode; and a reusing step for reusing the separated liquid part which is free from the muddy particles by the solid-liquid separating step in the water excavation works; and a solid part treatment step for dehydrating the solid part separated at the second solid-liquid separating step, wherein the first and second separating steps use a separating system with a valve means for alternatively switching between the first and second operation modes.

2. The water treatment method according to claim 1, wherein the separating system is a centrifugal separator.

* * * * *